US009037771B2

(12) United States Patent
Ota et al.

(10) Patent No.: US 9,037,771 B2
(45) Date of Patent: May 19, 2015

(54) COMMUNICATION DEVICE AND CONVERSION ADAPTER

(75) Inventors: Yuya Ota, Kawasaki (JP); Tomokazu Mori, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1010 days.

(21) Appl. No.: 12/629,744

(22) Filed: Dec. 2, 2009

(65) Prior Publication Data

US 2010/0132004 A1 May 27, 2010

Related U.S. Application Data

(63) Continuation of application No. PCT/JP2009/002477, filed on Jun. 2, 2009.

(30) Foreign Application Priority Data

Jun. 3, 2008 (JP) ................................ 2008-146216
Jun. 1, 2009 (JP) ................................ 2009-132112

(51) Int. Cl.

| | |
|---|---|
| ***G06F 13/00*** | (2006.01) |
| ***H04N 5/44*** | (2011.01) |
| ***G06F 13/40*** | (2006.01) |
| ***G06F 13/38*** | (2006.01) |
| ***H04N 5/775*** | (2006.01) |
| ***H04N 21/4363*** | (2011.01) |
| *H04N 5/77* | (2006.01) |

(52) U.S. Cl.

CPC .......... *H04N 5/4401* (2013.01); *G06F 13/4022* (2013.01); *G06F 13/387* (2013.01); *H04N 5/772* (2013.01); *H04N 5/775* (2013.01); *H04N 21/43632* (2013.01)

(58) Field of Classification Search

USPC ................. 710/104–110, 305–306, 310–317
See application file for complete search history.

(56) References Cited

U.S. PATENT DOCUMENTS

| | | | |
|---|---|---|---|
| 6,314,479 | B1 | 11/2001 | Frederick et al. |
| 6,992,987 | B2 | 1/2006 | Kobayashi |
| 7,068,686 | B2 | 6/2006 | Kobayashi |
| 7,088,741 | B2 | 8/2006 | Kobayashi |
| 7,337,977 | B2 | 3/2008 | Chen et al. |

(Continued)

FOREIGN PATENT DOCUMENTS

| | | | |
|---|---|---|---|
| JP | 11-052915 | A | 2/1999 |
| JP | 11-161460 | A | 6/1999 |

(Continued)

OTHER PUBLICATIONS

The above reference was cited in a Apr. 19, 2013 Japanese Office Action, which is enclosed without English Translation, that issued in Japanese Patent Application No. 2008-146216.

(Continued)

*Primary Examiner* — Raymond Phan
(74) *Attorney, Agent, or Firm* — Cowan, Liebowitz & Latman, P.C.

(57) ABSTRACT

A communication device includes a first communication unit that complies with an HDMI (High-Definition Multimedia Interface) standard and a second communication unit that complies with a USB (Universal Serial Bus) standard. The communication device selects one of the first communication unit and the second communication unit as a communication unit that uses a DDC (Display Data Channel) line.

18 Claims, 18 Drawing Sheets

(56) References Cited

U.S. PATENT DOCUMENTS

| | | | | |
|---|---|---|---|---|
| 7,405,719 | B2 | 7/2008 | Kobayashi | |
| 7,424,558 | B2 | 9/2008 | Kobayashi | |
| 7,487,273 | B2 | 2/2009 | Kobayashi | |
| 7,620,062 | B2 | 11/2009 | Kobayashi | |
| 7,733,915 | B2 | 6/2010 | Kobayashi | |
| 7,800,623 | B2 | 9/2010 | Kobayashi | |
| 7,856,520 | B2 | 12/2010 | Ranade et al. | |
| 8,090,030 | B2 | 1/2012 | Kim et al. | |
| 8,176,214 | B2 * | 5/2012 | Jones et al. | 710/14 |
| 8,208,786 | B2 | 6/2012 | Tan et al. | |
| 8,504,823 | B2 * | 8/2013 | Carpenter et al. | 713/158 |
| 8,517,772 | B2 * | 8/2013 | Wu | 439/638 |
| 8,651,368 | B2 * | 2/2014 | Slaby et al. | 235/375 |
| 2004/0218599 | A1 | 11/2004 | Kobayashi | |
| 2004/0218624 | A1 | 11/2004 | Kobayashi | |
| 2004/0221312 | A1 | 11/2004 | Kobayashi | |
| 2004/0221315 | A1 | 11/2004 | Kobayashi | |
| 2009/0177820 | A1 | 7/2009 | Ranade et al. | |
| 2009/0178097 | A1 | 7/2009 | Kim et al. | |
| 2010/0129062 | A1 | 5/2010 | Nakajima et al. | |
| 2010/0188576 | A1 * | 7/2010 | Mizushima | 348/554 |
| 2010/0245667 | A1 * | 9/2010 | Hardacker et al. | 348/552 |
| 2010/0332569 | A1 * | 12/2010 | Bryant-Rich et al. | 707/912 |
| 2011/0271296 | A1 * | 11/2011 | Tu et al. | 725/25 |

FOREIGN PATENT DOCUMENTS

| | | | |
|---|---|---|---|
| JP | 2000-003236 | A | 1/2000 |
| JP | 2001-014075 | A | 1/2001 |
| JP | 2011-509599 | A | 3/2001 |
| JP | 2004-288141 | A | 10/2004 |
| JP | 2005-051740 | A | 2/2005 |
| JP | 2005-084881 | A | 3/2005 |
| JP | 2007-518215 | A | 7/2007 |
| JP | 2011-508930 | A | 3/2011 |
| WO | 2008/056718 | A | 5/2008 |
| WO | 2008-056718 | A | 5/2008 |

OTHER PUBLICATIONS

The above foreign patent document 1 was cited in a Jul. 16, 2013 Decision to Grant a Patent, which is enclosed without an English Translation, that issued in Japanese Patent Application No. 2008-146216.

* cited by examiner

FIG. 2

HDMI TYPE A CONNECTOR PIN ASSIGNMENT

| PIN NUMBER | SIGNAL ARRANGEMENT | |
|---|---|---|
| 1 | TMDS Data2+ | |
| 3 | TMDS Data2- | |
| 5 | TMDS Data1 Shield | |
| 7 | TMDS Data0+ | |
| 9 | TMDS Data0- | |
| 11 | TMDS Clock Shield | |
| 13 | CEC | USB SWITCHING CONTROL |
| 15 | SCL | D+ |
| 17 | DDC / CEC Ground | GND |
| 19 | Hot Plug Detect | |

| PIN NUMBER | SIGNAL ARRANGEMENT | |
|---|---|---|
| 2 | TMDS Data2 Shield | |
| 4 | TMDS Data1+ | |
| 6 | TMDS Data1- | |
| 8 | TMDS Data0 Shield | |
| 10 | TMDS Clock+ | |
| 12 | TMDS Clock- | |
| 14 | Reserved (N.C.on device) | |
| 16 | SDA | D- |
| 18 | +5V Power | |

FIG. 3

HDMI TYPE B CONNECTOR PIN ASSIGNMENT

| PIN NUMBER | SIGNAL ARRANGEMENT | |
|---|---|---|
| 1 | TMDS Data2+ | |
| 3 | TMDS Data2- | |
| 5 | TMDS Data1 Shield | |
| 7 | TMDS Data0+ | |
| 9 | TMDS Data0- | |
| 11 | TMDS Clock Shield | |
| 13 | TMDS Data5+ | |
| 15 | TMDS Data5- | |
| 17 | TMDS Data4 Shield | |
| 19 | TMDS Data3+ | |
| 21 | TMDS Data3- | |
| 23 | Reserved | |
| ㉕ | SCL | D+ |
| ㉗ | DDC / CEC Ground | GND |
| 29 | Hot Plug Detect | |

| PIN NUMBER | SIGNAL ARRANGEMENT | |
|---|---|---|
| 2 | TMDS Data2 Shield | |
| 4 | TMDS Data1+ | |
| 6 | TMDS Data1- | |
| 8 | TMDS Data0 Shield | |
| 10 | TMDS Clock+ | |
| 12 | TMDS Clock- | |
| 14 | TMDS Data5 Shield | |
| 16 | TMDS Data4+ | |
| 18 | TMDS Data4- | |
| 20 | TMDS Data3 Shield | |
| ㉒ | CEC | USB SWITCHING CONTROL |
| 24 | Reserved (N.C.on device) | |
| ㉖ | SDA | D- |
| 28 | +5V Power | |

FIG. 4

HDMI TYPE C CONNECTOR PIN ASSIGNMENT

| PIN NUMBER | SIGNAL ARRANGEMENT | |
|---|---|---|
| 1 | TMDS Data2 Shield | |
| 2 | TMDS Data2+ | |
| 3 | TMDS Data2- | |
| 4 | TMDS Data1 Shield | |
| 5 | TMDS Data1+ | |
| 6 | TMDS Data1- | |
| 7 | TMDS Data0 Shield | |
| 8 | TMDS Data0+ | |
| 9 | TMDS Data0- | |
| 10 | TMDS Clock Shield | |
| 11 | TMDS Clock+ | |
| 12 | TMDS Clock- | |
| (13) | DDC / CEC Ground | GND |
| (14) | CEC | USB SWITCHING CONTROL |
| (15) | SCL | D+ |
| (16) | SDA | D- |
| 17 | Reserved | |
| 18 | +5V Power | |
| 19 | Hot Plug Detect | |

FIG. 8

HDMI TYPE A CONNECTOR PIN ASSIGNMENT

| PIN NUMBER | SIGNAL ARRANGEMENT | |
|---|---|---|
| 1 | TMDS Data2+ | |
| 3 | TMDS Data2- | |
| 5 | TMDS Data1 Shield | |
| 7 | TMDS Data0+ | |
| 9 | TMDS Data0- | |
| 11 | TMDS Clock Shield | |
| 13 | CEC | |
| (15) | SCL | D+ |
| (17) | DDC / CEC Ground | GND |
| 19 | Hot Plug Detect | |

| PIN NUMBER | SIGNAL ARRANGEMENT | |
|---|---|---|
| 2 | TMDS Data2 Shield | |
| 4 | TMDS Data1+ | |
| 6 | TMDS Data1- | |
| 8 | TMDS Data0 Shield | |
| 10 | TMDS Clock+ | |
| 12 | TMDS Clock- | |
| (14) | Reserved (N.C.on device) | VBUS |
| (16) | SDA | D- |
| 18 | +5V Power | |

FIG. 9

HDMI TYPE B CONNECTOR PIN ASSIGNMENT

| PIN NUMBER | SIGNAL ARRANGEMENT | |
|---|---|---|
| 1 | TMDS Data2+ | |
| 3 | TMDS Data2- | |
| 5 | TMDS Data1 Shield | |
| 7 | TMDS Data0+ | |
| 9 | TMDS Data0- | |
| 11 | TMDS Clock Shield | |
| 13 | TMDS Data5+ | |
| 15 | TMDS Data5- | |
| 17 | TMDS Data4 Shield | |
| 19 | TMDS Data3+ | |
| 21 | TMDS Data3- | |
| ㉓ | Reserved (N.C.on device) | |
| ㉕ | SCL | D+ |
| ㉗ | DDC / CEC Ground | GND |
| 29 | Hot Plug Detect | |

| PIN NUMBER | SIGNAL ARRANGEMENT | |
|---|---|---|
| 2 | TMDS Data2 Shield | |
| 4 | TMDS Data1+ | |
| 6 | TMDS Data1- | |
| 8 | TMDS Data0 Shield | |
| 10 | TMDS Clock+ | |
| 12 | TMDS Clock- | |
| 14 | TMDS Data5 Shield | |
| 16 | TMDS Data4+ | |
| 18 | TMDS Data4- | |
| 20 | TMDS Data3 Shield | |
| 22 | CEC | |
| ㉔ | Reserved (N.C.on device) | VBUS |
| ㉖ | SDA | D- |
| 28 | +5V Power | |

FIG. 10

HDMI TYPE C CONNECTOR PIN ASSIGNMENT

| PIN NUMBER | SIGNAL ARRANGEMENT | |
|---|---|---|
| 1 | TMDS Data2 Shield | |
| 2 | TMDS Data2+ | |
| 3 | TMDS Data2- | |
| 4 | TMDS Data1 Shield | |
| 5 | TMDS Data1+ | |
| 6 | TMDS Data1- | |
| 7 | TMDS Data0 Shield | |
| 8 | TMDS Data0+ | |
| 9 | TMDS Data0- | |
| 10 | TMDS Clock Shield | |
| 11 | TMDS Clock+ | |
| 12 | TMDS Clock- | |
| ⑬ | DDC / CEC Ground | GND |
| 14 | CEC | |
| ⑮ | SCL | D+ |
| ⑯ | SDA | D- |
| ⑰ | Reserved | VBUS |
| 18 | +5V Power | |
| 19 | Hot Plug Detect | |

F I G. 16
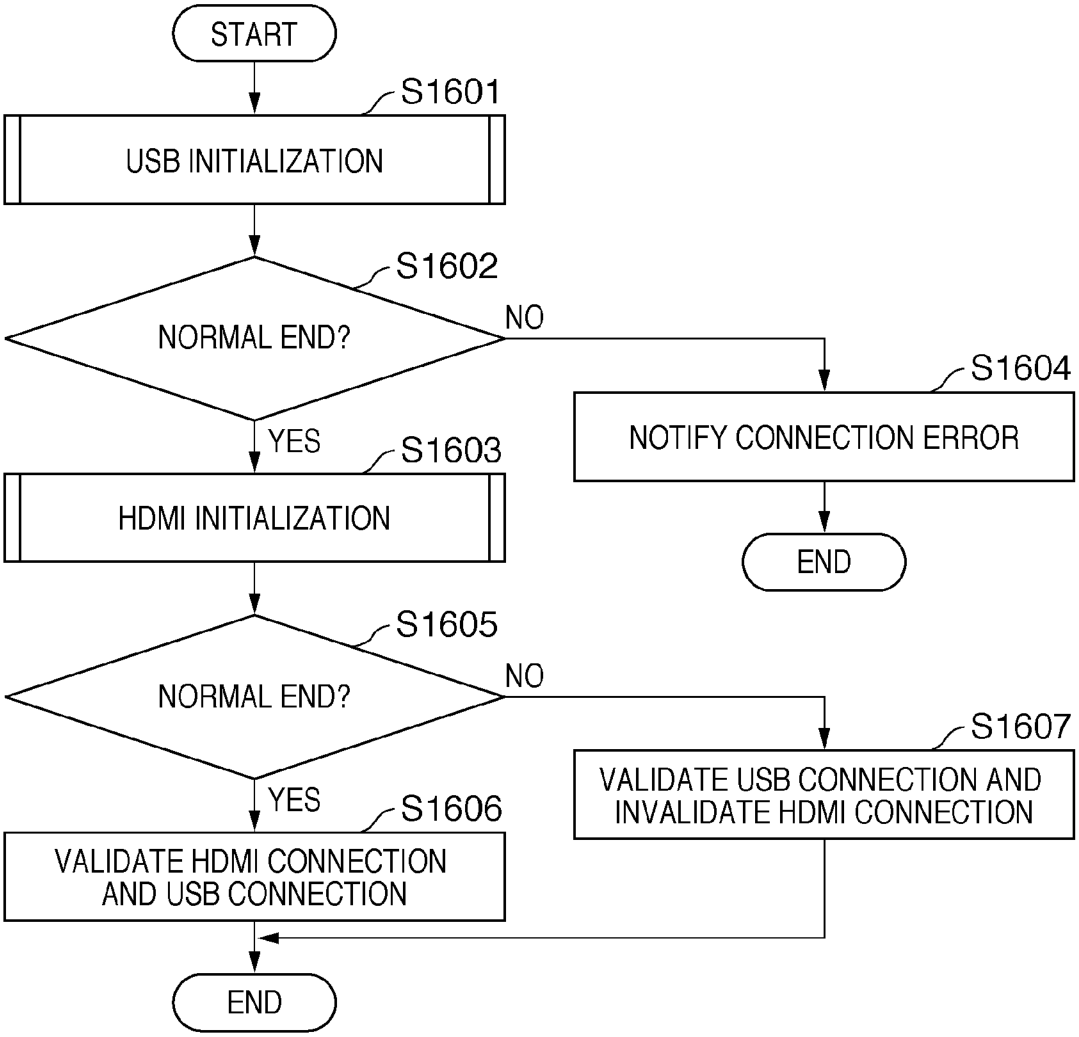

COMMUNICATION DEVICE AND CONVERSION ADAPTER

CROSS-REFERENCE TO RELATED APPLICATIONS

This application is a continuation application of International Application No. PCT/JP2009/002477, filed Jun. 2, 2009, whose benefit is claimed and which claims the benefit of Japanese Patent Applications No. 2008-146216 (filed Jun. 3, 2008) and 2009-132112 (filed Jun. 1, 2009) whose benefit is also claimed.

TECHNICAL FIELD

The present invention relates to a communication device, a conversion adapter, and control methods thereof.

BACKGROUND ART

In recent years, a High-Definition Multimedia Interface (HDMI®) capable of digital high-definition television transmission is becoming common as a communication interface (I/F) for a video device such as a Digital Television (DTV). The HDMI is mainly used for video transmission and can transmit not only a video signal but also an audio signal via a single cable. The HDMI also has a copyright protection mechanism called High-bandwidth Digital Content Protection (HDCP).

The HDMI standard version 1.3 which defines a small connector called type C as well assuming connection to a device such as a digital camera is expected to be implemented on more video devices in the future.

On the other hand, a Universal Serial Bus (USB) is often used as a communication I/F for data transmission/reception of each file or the like. A personal computer (PC) normally has a USB terminal. There is also a growth in the number of DTVs having a USB terminal.

For example, Japanese Patent Laid-Open No. 2004-288141 proposes a memory card capable of using, for example, a USB and a Secure Digital (SD) memory card I/F.

SUMMARY OF INVENTION

Problems that the Invention is to Solve

In the above-described prior arts, however, the HDMI and USB cannot be used simultaneously. For this reason, it is impossible to transmit a video via the HDMI and simultaneously transfer a file via the USB. The HDMI is used for video transmission and, for example, to view a movie on a DTV. If the HDMI and USB cannot be used simultaneously, the video of a movie a user is viewing stops due to, for example, file transfer on the USB.

The present invention is directed to, for example, provide a technique of making two communication I/Fs (e.g., HDMI and USB) usable simultaneously.

Furthermore, the present invention is directed to, for example, make the USB usable while the HDMI is transmitting image data.

Means of Solving the Problems

One of communication devices according to the present invention comprises a first communication unit that complies with an HDMI (High-Definition Multimedia Interface) standard, a second communication unit that complies with a USB (Universal Serial Bus) standard, and a controller that selects one of the first communication unit and the second communication unit as a communication unit that uses a DDC (Display Data Channel) line.

One of communication devices according to the present invention comprises a first communication unit that complies with an HDMI (High-Definition Multimedia Interface) standard, and a second communication unit that complies with a USB (Universal Serial Bus) standard, wherein the second communication unit transmits EDID (Extended Display Identification Data) information of the communication device to an external device via a DDC (Display Data Channel) line.

One of conversion adapters according to the present invention comprises a first connector, a second connector that complies with an HDMI (High-Definition Multimedia Interface) standard, a third connector that complies with a USB (Universal Serial Bus) standard, and a selector that connects one of a DDC (Display Data Channel) line of the second connector and a data line of the third connector to a DDC line of the first connector.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 2 is a view showing an example of pin assignment when a combined HDMI cable according to the first embodiment complies with a type A connector of the HDMI standard;

FIG. 3 is a view showing an example of pin assignment when the combined HDMI cable according to the first embodiment complies with a type B connector of the HDMI standard;

FIG. 4 is a view showing an example of pin assignment when the combined HDMI cable according to the first embodiment complies with a type C connector of the HDMI standard;

FIG. 8 is a view showing an example of pin assignment when a combined HDMI cable according to the second embodiment complies with a type A connector of the HDMI standard;

FIG. 9 is a view showing an example of pin assignment when the combined HDMI cable according to the second embodiment complies with a type B connector of the HDMI standard;

FIG. 10 is a view showing an example of pin assignment when the combined HDMI cable according to the second embodiment complies with a type C connector of the HDMI standard;

FIG. 16 is a flowchart illustrating a process of initializing USB connection and HDMI connection;

MODE FOR CARRYING OUT THE INVENTION

Embodiments of the present invention will now be described with reference to the accompanying drawings. Individual embodiments to be described below will serve to understand various concepts including the superordinate concept and subordinate concept of the present invention.

The technical scope of the present invention is determined by the scope of claims and is not limited by the following individual embodiments. In addition, all combinations of features described in the embodiments are not necessarily essential for the present invention.

First Embodiment

Figure 1:
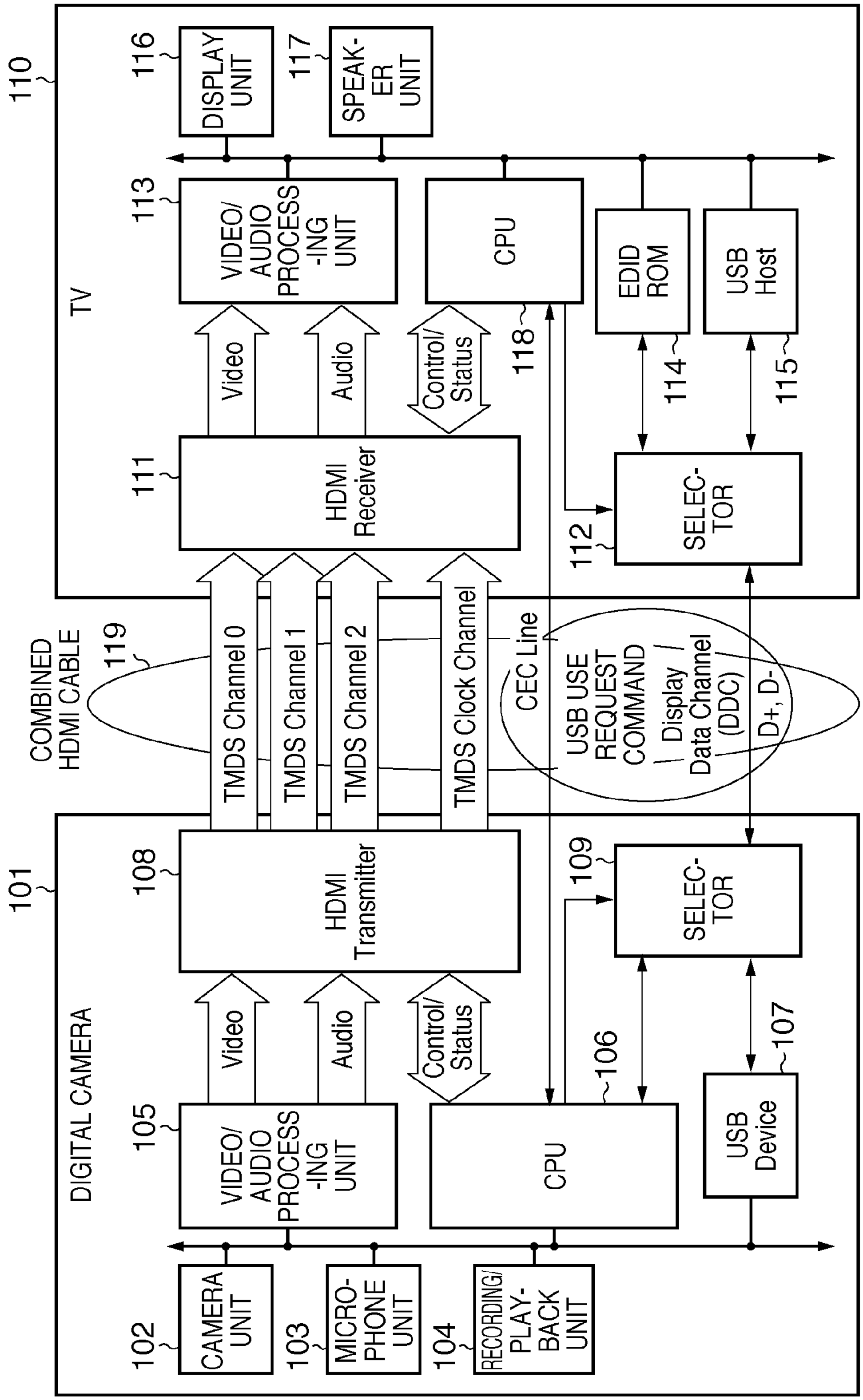
FIG. 1 is a block diagram showing arrangements of a digital camera and a television (TV) each of which serves as a communication device according to the first embodiment.

FIG. 1 is a block diagram showing arrangements of a digital camera 101 and a television (TV) 110 each of which serves as a communication device according to the first embodiment. In the first embodiment, the digital camera 101 operates as a source of the HDMI standard and a device of the USB standard. A communication device which operates as a source of the HDMI standard will be referred to as an "HDMI source", and a communication device which operates as a device (peripheral) of the USB standard will be referred to as a "USB device" hereinafter. The digital camera 101 also operates as a communication device (transmission source) and a video output device. In the first embodiment, the TV 110 operates as a sink of the HDMI standard and a host of the USB standard. A communication device which operates as a sink of the HDMI standard will be referred to as an "HDMI sink", and a communication device which operates as a host of the USB standard will be referred to as a "USB host" hereinafter. The TV 110 also operates as a communication device (transmission destination) and a video input device.

Note that in the first embodiment, a communication device which performs communication complying with two standards, that is, the HDMI standard (first standard) and the USB standard (second standard) will be explained. However, the HDMI standard and USB standard are mere examples. The first embodiment is applicable to any other standards.

The digital camera 101 includes a camera unit 102 which captures an image, a microphone unit 103 which acquires an audio, and a recording/playback unit 104 which records and plays back image data corresponding to the captured image. The digital camera 101 also includes an HDMI transmitter 108 which transmits a video and audio via TMDS lines, and a video/audio processing unit 105 which converts the recorded video and audio into a format transmittable from the HDMI transmitter 108. The digital camera 101 also includes a CPU 106 which performs various kinds of control, and a USB device controller 107.

The digital camera 101 has a communication I/F complying with the HDMI standard and can therefore use TMDS lines, a CEC line, and a DDC line (SCL and SDA). The DDC (Display Data Channel) line includes an SCL line and an SDA line. The digital camera 101 uses the DDC line for data communication complying with the USB standard as needed, thereby simultaneously implementing video and audio transmissions (communication of the HDMI standard) via the TMDS lines and communication of the USB standard. To do this, the digital camera 101 includes a selector 109 to selectively use the DDC line (SCL and SDA) as a data line (D+ and D−) of the USB standard or a DDC line (SCL and SDA) of the HDMI standard.

In the present application, an element which performs communication complying with the HDMI standard in the digital camera 101 will be referred to as a first communication unit, and an element which performs communication complying with the USB standard will be referred to as a second communication unit (this also applies to the TV 110).

The TV 110 includes a display unit 116 which displays a video, a speaker unit 117 which outputs an audio, an HDMI receiver 111 which receives a video and audio via the TMDS lines, and a USB host controller 115. The TV 110 also includes a video/audio processing unit 113 which processes the video and audio received via the HDMI receiver, a CPU 118 which performs various kinds of control, and an EDID ROM 114 serving as a memory to store information of the configuration of the TV 110, an outputtable resolution and the like. The EDID ROM 114 stores EDID (Extended Display Identification Data) information.

Like the digital camera 101, the TV 110 has a communication I/F complying with the HDMI standard and can therefore use TMDS lines, a CEC line and a DDC line (SCL and SDA). The TV 110 includes a selector 112 to selectively use the DDC line (SCL and SDA) as a data line (D+ and D−) of the USB standard or a DDC line (SCL and SDA) of the HDMI standard.

The digital camera 101 and the TV 110 are connected via a combined HDMI cable 119. Assignment of pins (pin assignment) of the combined HDMI cable 119 will be explained with reference to FIGS. 2 to 4.

FIG. 2 is a view showing an example of pin assignment when the combined HDMI cable 119 complies with a type A connector of the HDMI standard.

In the example shown in FIG. 2, the combined HDMI cable 119 has pins Nos. 1 to 19. Pins Nos. 1 to 19 are configured to be usable as signal lines of the HDMI standard. Pins Nos. 15, 16 and 17 are configured to be usable as signal lines of the USB standard as well. As shown in FIG. 2, pin No. 15 is used as the SCL line of the HDMI standard and also as the D+ line of the USB standard. Pin No. 16 is used as the SDA line of the HDMI standard and also as the D− line of the USB standard. Pin No. 17 is used as the DDC/CEC Ground line of the HDMI standard and also as the Ground line (GND) of the USB standard. The DDC/CEC Ground line of the HDMI standard is used as the Ground line of the DDC line and the CEC line.

The CEC line assigned to pin No. 13 is a control line called Consumer Electronics Control. The CEC line is used for the purpose of operating another device by sending a CEC command. More specifically, for example, when a TV is connected to an HDD recorder via an HDMI cable to allow a user to operate the HDD recorder using the remote controller of the TV, the TV transmits a CEC command to the HDD recorder via the CEC line. According to the HDMI standard, the CEC command is extensible by a device vender. In the first embodiment, an example will be described in which extended CEC commands are used to selectively use the DDC line (SCL and SDA) as the data line (D+ and D−) of the USB standard or the DDC line (SCL and SDA) of the HDMI standard.

More specifically, a "USB on request command (first switching instruction)" and a "USB off request command (second switching instruction)" are defined as extended CEC commands and used for switching control. The USB on request command and USB off request command can be defined arbitrarily as far as they do not violate the CEC standard.

FIG. 3 is a view showing pin assignment when the combined HDMI cable 119 complies with a type B connector of the HDMI standard.

In the example shown in FIG. 3, the combined HDMI cable 119 has pins Nos. 1 to 29. Pins Nos. 1 to 29 are configured to be usable as signal lines of the HDMI standard. Pins Nos. 25, 26 and 27 are configured to be usable as signal lines of the USB standard as well. As shown in FIG. 3, pin No. 25 is used as the SCL line of the HDMI standard and also as the D+ line of the USB standard. Pin No. 26 is used as the SDA line of the HDMI standard and also as the D− line of the USB standard. Pin No. 27 is used as the DDC/CEC Ground line of the HDMI standard and also as the Ground line (GND) of the USB standard.

FIG. 4 is a view showing pin assignment when the combined HDMI cable 119 complies with a type C connector of the HDMI standard.

In the example shown in FIG. 4, the combined HDMI cable 119 has pins Nos. 1 to 19. Pins Nos. 1 to 19 are configured to be usable as signal lines of the HDMI standard. Pins Nos. 13, 15 and 16 are configured to be usable as signal lines of the USB standard as well. As shown in FIG. 4, pin No. 15 is used as the SCL line of the HDMI standard and also as the D+ line of the USB standard. Pin No. 16 is used as the SDA line of the HDMI standard and also as the D− line of the USB standard. Pin No. 13 is used as the DDC/CEC Ground line of the HDMI standard and also as the Ground line (GND) of the USB standard.

Figure 5:
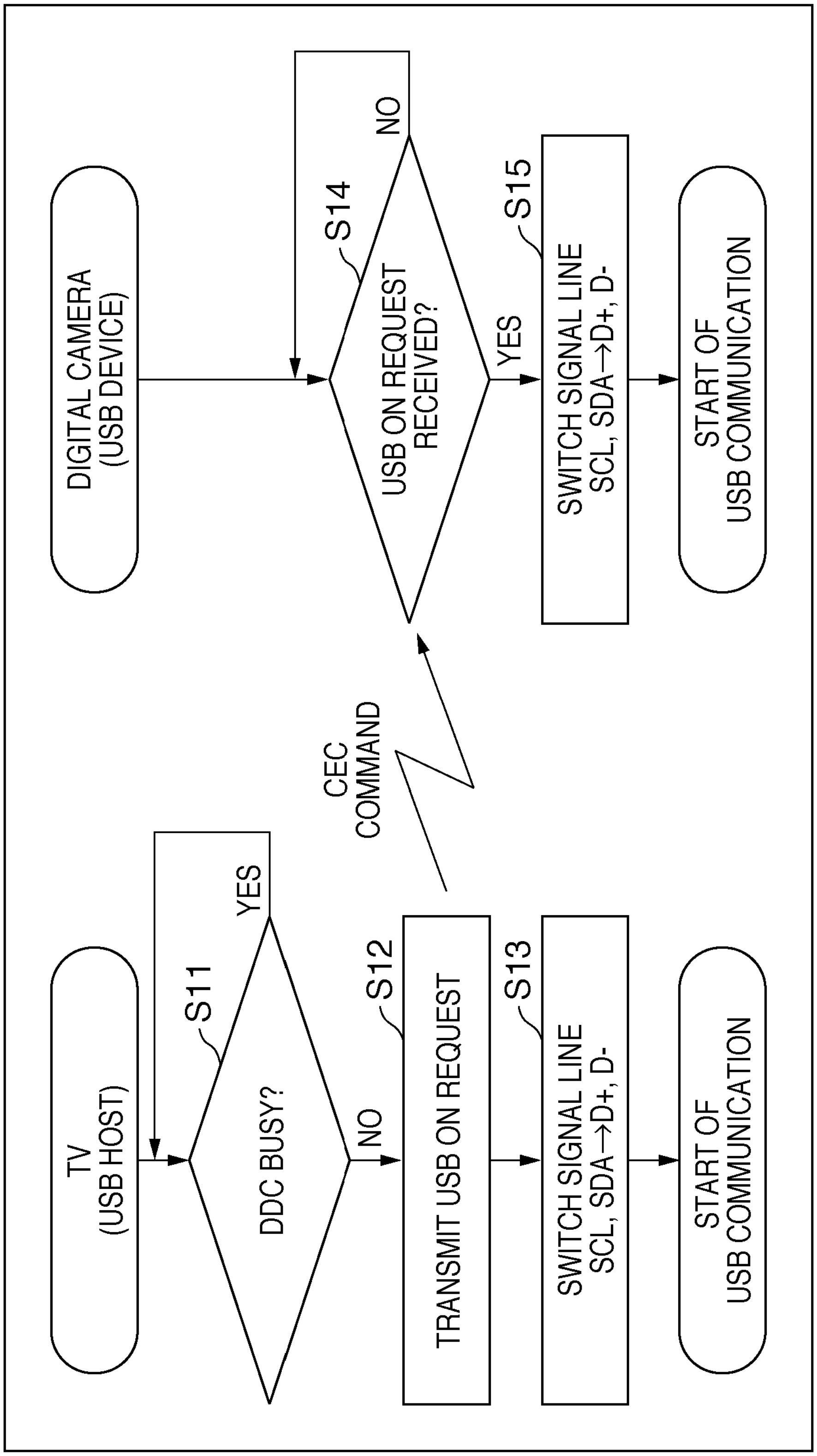
FIG. 5 is a flowchart illustrating a process of switching a DDC line (SCL and SDA) according to the first embodiment from use of the HDMI standard to use of the USB standard.

FIG. 5 is a flowchart illustrating a process of switching the DDC line (SCL and SDA) from use of the HDMI standard to use of the USB standard. The flowchart shown on FIG. 5 starts when, for example, the user instructs the TV 110 serving as the USB host to start using the USB function.

In step S11, the CPU 118 of the TV 110 determines whether the DDC line is busy. When the digital camera 101 is reading out EDID information from the EDID ROM 114 via the DDC line, the CPU 118 determines that the DDC line is busy. When the digital camera 101 is connected to the TV 110, the digital camera 101 reads out EDID information from the EDID ROM 114 via the DDC line. The digital camera 101 also reads out EDID information from the EDID ROM 114 via the DDC line when the resolution of a video displayed on the TV 110 has changed.

In step S12, the CPU 118 transmits the USB on request command to the digital camera 101 via the CEC line. The USB on request command is a command defined as one of the extended CEC commands. The USB on request command requests the digital camera 101 to turn on its USB function. The USB on request command also requests the digital camera to switch the DDC line from use of the HDMI standard to use of the USB standard.

In step S13, the CPU 118 connects the selector 112 to the USB host controller 115 by controlling the selector 112 to turn on the USB function of the TV 110. The DDC line (SCL line and SDA line) and the DDC/CEC Ground line are thus connected to the USB host controller 115 via the selector 112. The SCL line is connected to the USB host controller 115 so as to be usable as the D+ line of the USB standard. The SDA line is connected to the USB host controller 115 so as to be usable as the D− line of the USB standard. The DDC/CEC Ground line is connected to the USB host controller 115 so as to be usable as the Ground line (GND) of the USB standard. The USB host controller 115 becomes able to perform data transfer (including file transfer) complying with the USB standard.

In step S14, the CPU 106 of the digital camera 101 determines whether the USB on request command transmitted from the TV 110 via the CEC line is received. If the USB on request command is received, the flowchart advances from step S14 to step S15.

In step S15, the CPU 106 connects the selector 109 to the USB device controller 107 by controlling the selector 109 to turn on the USB function of the digital camera 101. The DDC line (SCL line and SDA line) and the DDC/CEC Ground line are thus connected to the USB device controller 107 via the selector 109. The SCL line is connected to the USB device controller 107 so as to be usable as the D+ line of the USB standard. The SDA line is connected to the USB device controller 107 so as to be usable as the D− line of the USB standard. The DDC/CEC Ground line is connected to the USB device controller 107 so as to be usable as the Ground line (GND) of the USB standard. The USB device controller 107 becomes able to perform data transfer (including file transfer) complying with the USB standard.

After steps S13 and S15, the digital camera 101 and the TV 110 can perform data transfer complying with the USB standard. For example, the digital camera 101 can transfer a still image file, a moving image file, a music file and the like selected by the user to the TV 110 via the DDC line. The TV 110 can also transfer a still image file, a moving image file, a music file and the like selected by the user to the digital camera 101 via the DDC line.

Figure 6:
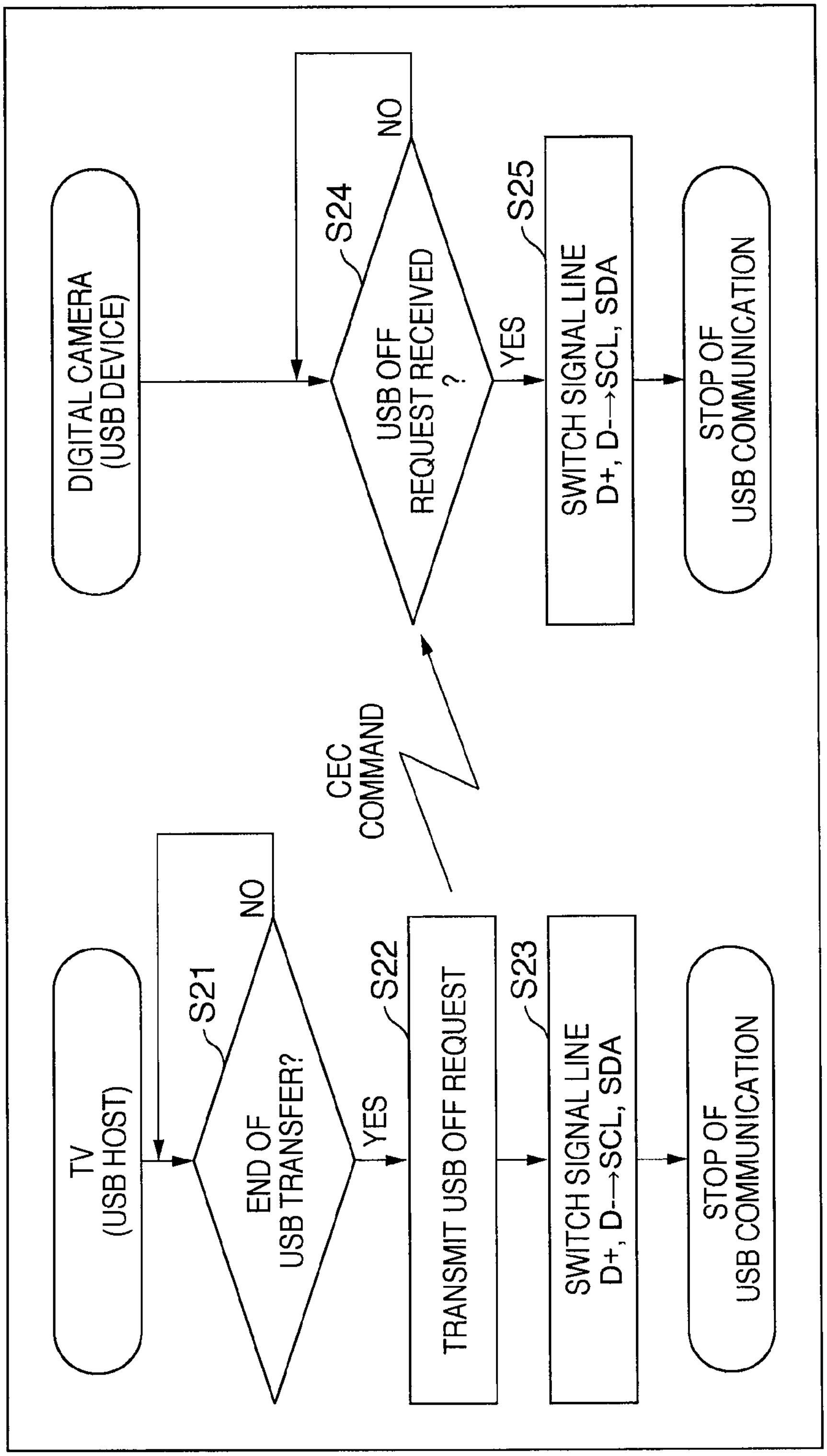
FIG. 6 is a flowchart illustrating a process of switching the DDC line (SCL and SDA) according to the first embodiment from use of the USB standard to use of the HDMI standard.

FIG. 6 is a flowchart illustrating a process of switching the DDC line (SCL and SDA) from use of the USB standard to use of the HDMI standard. The flowchart shown on FIG. 6 starts when, for example, the user instructs the TV 110 serving as the USB host to stop using the USB function.

In step S21, the CPU 118 of the TV 110 determines whether the DDC line is busy. When data transfer complying with the USB standard has not finished yet, the CPU 118 determines that the DDC line is busy. If it is determined that the DDC line is not busy, the flowchart advances from step S21 to step S22.

In step S22, the CPU 118 transmits the USB off request command to the digital camera 101 via the CEC line. The USB off request command is a command defined as one of the extended CEC commands. The USB off request command requests the digital camera 101 to turn off its USB function. The USB off request command also requests the digital camera to switch the DDC line from use of the USB standard to use of the HDMI standard.

In step S23, the CPU 118 connects the selector 112 to the EDID ROM 114 by controlling the selector 112 to turn off the USB function of the TV 110. The DDC line (SCL line and SDA line) and the DDC/CEC Ground line are thus connected to the EDID ROM 114 via the selector 112. The SCL line is connected to the EDID ROM 114 so as to be unusable as the D+ line of the USB standard. The SDA line is connected to the EDID ROM 114 so as to be unusable as the D− line of the USB standard. The DDC/CEC Ground line is connected to the EDID ROM 114 so as to be unusable as the Ground line (GND) of the USB standard. The USB host controller 115 becomes unable to perform data transfer (including file transfer) complying with the USB standard. The DDC line (SCL line and SDA line) and the DDC/CEC Ground line are used as lines complying with the HDMI standard.

In step S24, the CPU 106 of the digital camera 101 determines whether the USB off request command transmitted from the TV 110 via the CEC line is received. If the USB off request command is received, the flowchart advances from step S24 to step S25.

In step S25, the CPU 106 connects the selector 109 to the CPU 106 by controlling the selector 109 to turn off the USB function of the digital camera 101. The DDC line (SCL line and SDA line) and the DDC/CEC Ground line are thus connected to the CPU 106 via the selector 109. The SCL line is connected to the CPU 106 so as to be unusable as the D+ line of the USB standard. The SDA line is connected to the CPU 106 so as to be unusable as the D− line of the USB standard. The DDC/CEC Ground line is connected to the CPU 106 so as to be unusable as the Ground line (GND) of the USB standard. The USB device controller 107 becomes unable to perform data transfer (including file transfer) complying with the USB standard. The DDC line (SCL line and SDA line) and the DDC/CEC Ground line are used as lines complying with the HDMI standard.

In this way, the TV 110 and the digital camera 101 can use the CEC line for the USB function on request and off request.

Note that the selectors 109 and 112 select the communication units for the HDMI standard immediately after one of the TV 110 and the digital camera 101 is powered on or immediately after they are connected via the combined HDMI cable 119. This allows a device which does not support the combined HDMI cable 119 to perform communication complying with the HDMI standard as before.

As described above, according to the first embodiment, it is possible to perform data transfer based on the USB standard during a transmission of a video and audio via the TMDS lines of the HDMI standard. In the HDMI standard, three channels of TMDS lines are used to transmit a video and audio. However, the above-described extended CEC commands do not impede transmission and control of a video and audio via the TMDS lines.

According to the first embodiment, since the DDC line (SCL and SDA) of the HDMI standard also serves as the data line (D+ and D−) of the USB standard, the conventional HDMI connector can directly be used.

In the first embodiment, the combined HDMI cable 119 is usable even if at least one of the digital camera 101 and the TV 110 does not have the USB function. Hence, even when at least one of the digital camera 101 and the TV 110 does not have the USB function, the digital camera 101 and the TV 110 can perform communication complying with the HDMI standard.

According to the first embodiment, the digital camera 101 and the TV 110 have a first communication unit which performs communication via the DDC line and a second communication unit which performs communication via the DDC line (SCL and SDA). The CPU and the selector can select one of the first communication unit and the second communication unit as a communication unit which should use the DDC line (SCL and SDA).

Note that in the first embodiment, an embodiment in which the digital camera 101 serves as a communication device (transmission source) is described. However, the communication device (transmission source) according to the first embodiment can be any device other than the digital camera 101. For example, the communication device (transmission source) according to the first embodiment may be a video output device such as an HDD recorder, a DVD recorder, a personal computer, a set-top box, digital video camera, or a cellular phone.

Additionally, in the first embodiment, an embodiment in which the TV 110 serves as a communication device (transmission destination) is described. However, the communication device (transmission destination) according to the first embodiment can be any device other than the TV 110. For example, the communication device (transmission destination) according to the first embodiment may be a video input device such as a personal computer or a projector.

Second Embodiment

In the second embodiment, an example will be described in which a Reserved pin of the HDMI standard is used as a power line (VBUS) of the USB standard. This enables a USB device of the second embodiment to use a USB bus power.

Figure 7:
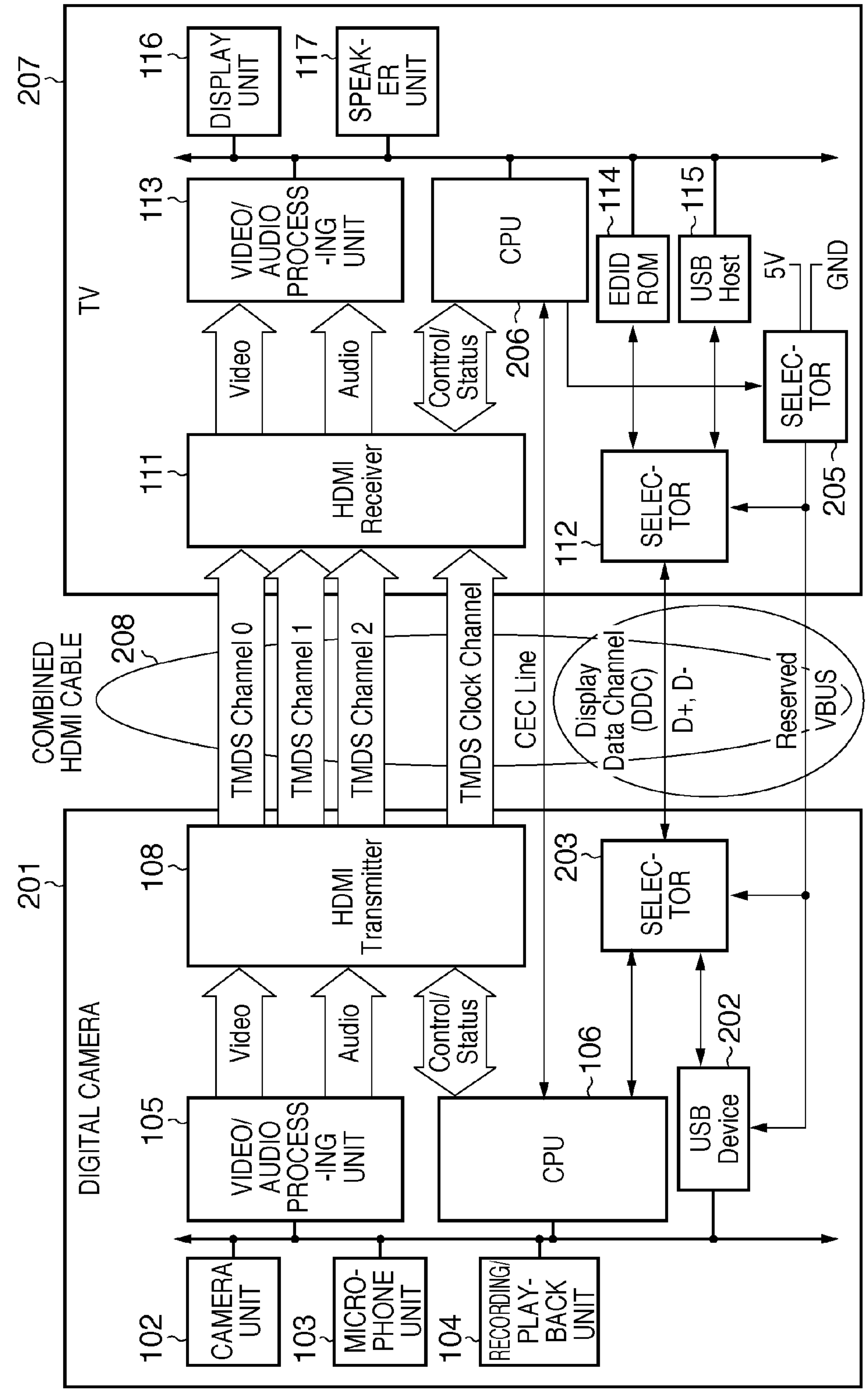
FIG. 7 is a block diagram showing arrangements of a digital camera and a television (TV) each of which serves as a communication device according to the second embodiment.

FIG. 7 is a block diagram showing arrangements of a digital camera 201 and a television (TV) 207 each of which serves as a communication device according to the second embodiment. In FIG. 7, the same reference numerals as in FIG. 1 denote the same constituent elements, and a description thereof will not be repeated.

The digital camera 201 includes a USB device controller 202 capable of detecting the state of the Reserved pin, and a selector 203.

The TV 207 includes a selector 205 which can change its state to assert or negate the Reserved pin under the control of a CPU 206. The TV 207 also includes a selector 112 to selectively use a DDC line (SCL and SDA) as a data line (D+ and D−) of the USB standard or a DDC line (SCL and SDA) of the HDMI standard in accordance with the state of the selector 205.

As shown in FIG. 7, the digital camera 201 and the TV 207 are connected via a combined HDMI cable 208. Examples of pin assignment of the combined HDMI cable 208 will be explained with reference to FIGS. 8 to 10.

FIG. 8 is a view showing pin assignment when the combined HDMI cable 208 complies with a type A connector of the HDMI standard.

In the example shown in FIG. 8, the combined HDMI cable 208 has pins Nos. 1 to 19. Pins Nos. 1 to 19 are configured to be usable as signal lines of the HDMI standard. Pins Nos. 14, 15, 16 and 17 are configured to be usable as signal lines of the USB standard as well. As shown in FIG. 8, pin No. 15 is used as the SCL line of the HDMI standard and also as the D+ line of the USB standard. Pin No. 16 is used as the SDA line of the HDMI standard and also as the D− line of the USB standard. Pin No. 17 is used as the DDC/CEC Ground line of the HDMI standard and also as the Ground line (GND) of the USB standard. Pin No. 14 is the Reserved pin of the HDMI standard and also serves as the power line (VBUS) of the USB standard.

When using the USB, the CPU 206 applies a voltage of 5 volt (5V) to the Reserved pin by controlling the selector 205 (i.e., asserts the Reserved pin). When the Reserved pin is asserted, the selectors 203 and 112 switch the DDC line (SCL and SDA) from use of the HDMI standard to use of the USB standard. The USB host controller 115 and the USB device controller 202 regard an asserted state of the Reserved pin as a pseudo USB cable inserted state. The USB host controller 115 and the USB device controller 202 regard a negated state of the Reserved pin as a pseudo USB cable disconnected state.

FIG. 9 is a view showing pin assignment when the combined HDMI cable 208 complies with a type B connector of the HDMI standard.

In the example shown in FIG. 9, the combined HDMI cable 208 has pins Nos. 1 to 19. Pins Nos. 1 to 19 are configured to be usable as signal lines of the HDMI standard. Pins Nos. 24, 25, 26 and 27 are configured to be usable as signal lines of the USB standard as well. As shown in FIG. 9, pin No. 25 is used as the SCL line of the HDMI standard and also as the D+ line of the USB standard. Pin No. 26 is used as the SDA line of the HDMI standard and also as the D− line of the USB standard. Pin No. 27 is used as the DDC/CEC Ground line of the HDMI standard and also as the Ground line (GND) of the USB standard. Pin No. 24 is the Reserved pin of the HDMI standard and also serves as the power line (VBUS) of the USB standard. Note that in the type B, pin No. 23 is also defined as the Reserved pin. Hence, pin No. 23 may be configured to be usable as the power line (VBUS) of the USB standard in place of pin No. 24.

FIG. 10 is a view showing pin assignment when the combined HDMI cable 208 complies with a type C connector of the HDMI standard.

In the example shown in FIG. 10, the combined HDMI cable 208 has pins Nos. 1 to 19. Pins Nos. 1 to 19 are configured to be usable as signal lines of the HDMI standard. Pins Nos. 13, 15, 16, and 17 are configured to be usable as signal lines of the USB standard as well. As shown in FIG. 10, pin No. 15 is used as the SCL line of the HDMI standard and also as the D+ line of the USB standard. Pin No. 16 is used as the SDA line of the HDMI standard and also as the D− line of the USB standard. Pin No. 13 is used as the DDC/CEC Ground line of the HDMI standard and also as the Ground line (GND) of the USB standard. Pin No. 17 is the Reserved pin of the HDMI standard and also serves as the power line (VBUS) of the USB standard.

Figure 11:
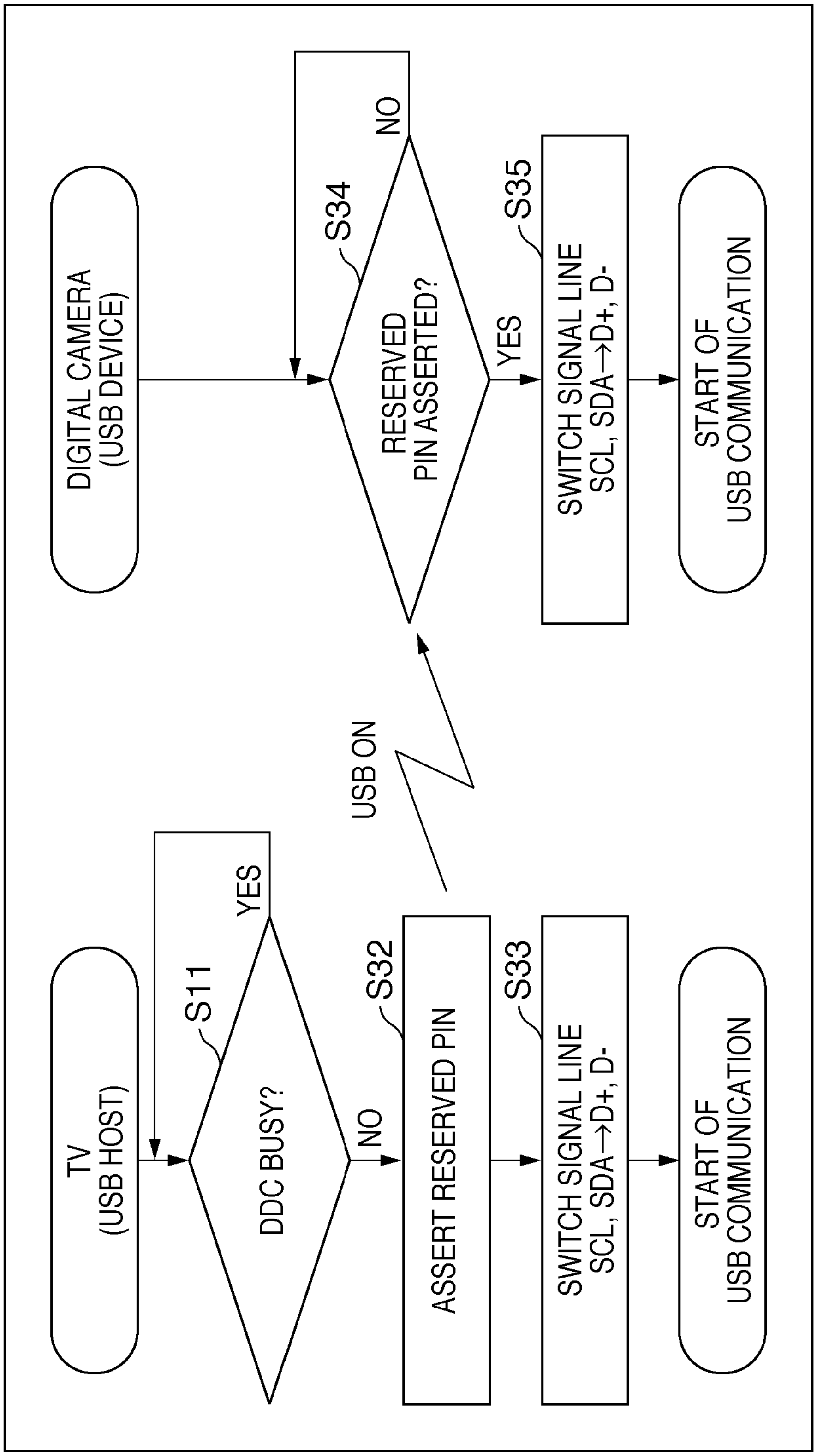
FIG. 11 is a flowchart illustrating a process of switching a DDC line (SCL and SDA) according to the second embodiment from use of the HDMI standard to use of the USB standard.

FIG. 11 is a flowchart illustrating a process of switching the DDC line (SCL and SDA) from use of the HDMI standard to use of the USB standard. The flowchart shown on FIG. 11 starts when, for example, the user instructs the TV 207 serving as the USB host to start using the USB function. In FIG. 11, the same step numbers as in FIG. 5 represent steps of performing the same processes, and a description thereof will not be repeated.

In step S32, the CPU 206 of the TV 207 asserts the Reserved pin by controlling the selector 205 to turn on the USB function of the digital camera 201. When the Reserved pin is asserted, the flowchart advances from step S32 to step S33.

In step S33, the selector 112 switches the DDC line (SCL and SDA) from use of the HDMI standard to use of the USB standard. The selector 112 connects the selector 112 to the USB host controller 115. The DDC line (SCL line and SDA line) and the DDC/CEC Ground line are thus connected to the USB host controller 115 via the selector 112. The SCL line is connected to the USB host controller 115 so as to be usable as the D+ line of the USB standard. The SDA line is connected to the USB host controller 115 so as to be usable as the D− line of the USB standard. The DDC/CEC Ground line is connected to the USB host controller 115 so as to be usable as the Ground line (GND) of the USB standard. The USB host controller 115 becomes able to perform data transfer (including file transfer) complying with the USB standard.

In step S34, the selector 203 of the digital camera 201 determines whether the Reserved pin is asserted. If the Reserved pin is asserted, the flowchart advances from step S34 to step S35.

In step S35, the selector 203 switches the DDC line (SCL and SDA) from use of the HDMI standard to use of the USB standard. The selector 203 connects the selector 203 to the USB device controller 202. The DDC line (SCL line and SDA line) and the DDC/CEC Ground line are thus connected to the USB device controller 202 via the selector 203. The SCL line is connected to the USB device controller 202 so as to be usable as the D+ line of the USB standard. The SDA line is connected to the USB device controller 202 so as to be usable as the D− line of the USB standard. The DDC/CEC Ground line is connected to the USB device controller 202 so as to be usable as the Ground line (GND) of the USB standard. The USB device controller 202 becomes able to perform data transfer (including file transfer) complying with the USB standard.

After steps S33 and S35, the digital camera 201 and the TV 207 can perform data transfer complying with the USB standard. For example, the digital camera 201 can transfer a still image file, a moving image file, a music file and the like selected by the user to the TV 207 via the DDC line. The TV 207 can also transfer a still image file, a moving image file, a music file and the like selected by the user to the digital camera 201 via the DDC line.

Figure 12:
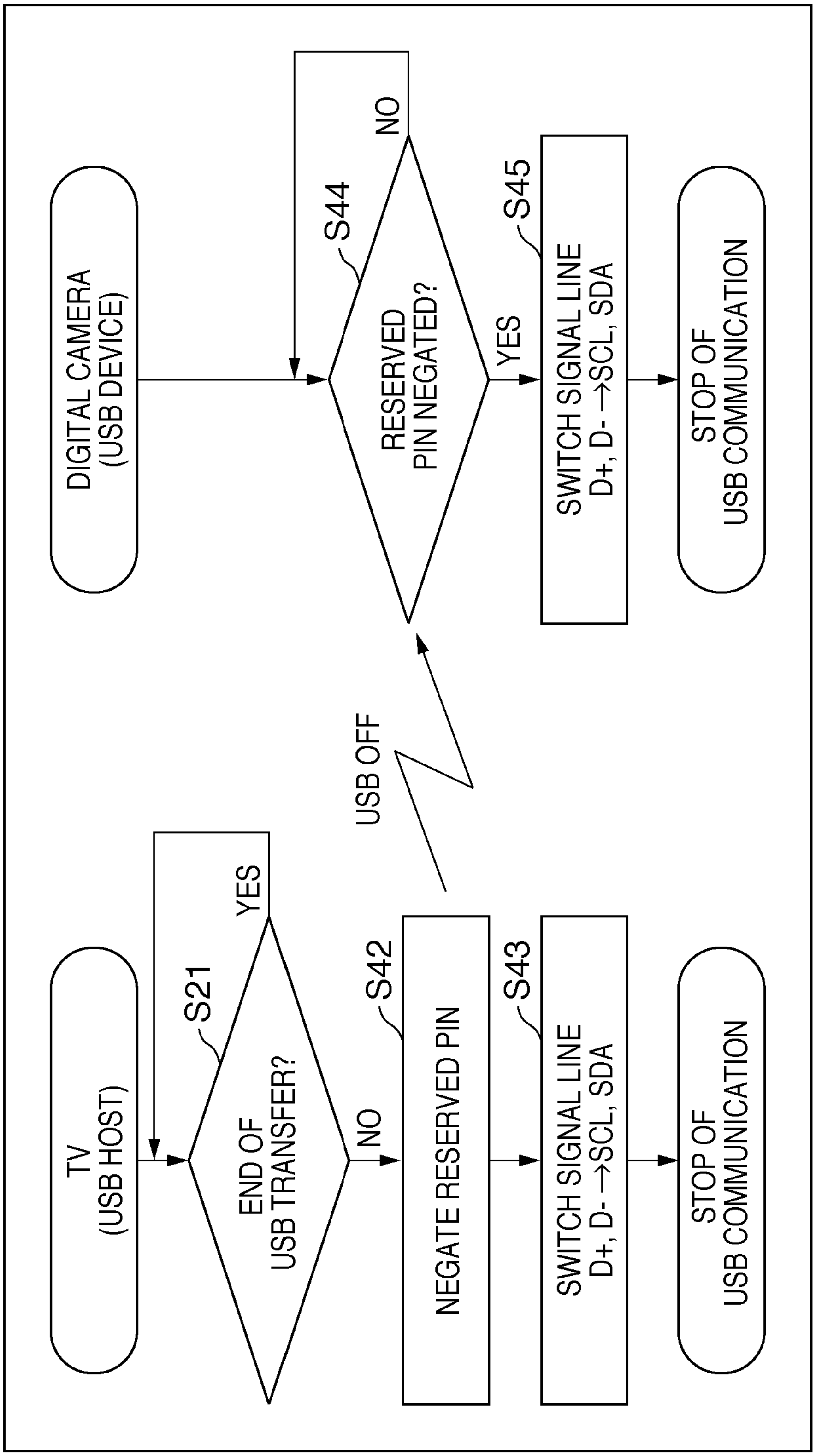
FIG. 12 is a flowchart illustrating a process of switching the DDC line (SCL and SDA) according to the second embodiment from use of the USB standard to use of the HDMI standard.

FIG. 12 is a flowchart illustrating a process of switching the DDC line (SCL and SDA) from use of the USB standard to use of the HDMI standard. The flowchart shown on FIG. 12 starts when, for example, the user instructs the TV 207 serving as the USB host to stop using the USB function. In FIG. 12, the same step numbers as in FIG. 6 represent steps of performing the same processes, and a description thereof will not be repeated.

In step S42, the CPU 206 of the TV 207 negates the Reserved pin by controlling the selector 205 to turn off the USB function of the TV 207. When the Reserved pin is negated, the flowchart advances from step S42 to step S43.

In step S43, the selector 204 switches the DDC line (SCL and SDA) from use of the USB standard to use of the HDMI standard. The selector 204 connects the selector 204 to the EDID ROM 114. The DDC line (SCL line and SDA line) and the DDC/CEC Ground line are thus connected to the EDID ROM 114 via the selector 112. The SCL line is connected to the EDID ROM 114 so as to be unusable as the D+ line of the USB standard. The SDA line is connected to the EDID ROM 114 so as to be unusable as the D− line of the USB standard. The DDC/CEC Ground line is connected to the EDID ROM 114 so as to be unusable as the Ground line (GND) of the USB standard. The USB host controller 115 becomes unable to perform data transfer (including file transfer) complying with the USB standard. The DDC line (SCL line and SDA line) and the DDC/CEC Ground line are used as lines complying with the HDMI standard.

In step S44, the selector 203 of the digital camera 201 determines whether the Reserved pin is negated. If the Reserved pin is negated, the flowchart advances from step S44 to step S45.

In step S45, the selector 203 switches the DDC line (SCL and SDA) from use of the USB standard to use of the HDMI standard. The selector 203 connects the selector 203 to the CPU 106. The DDC line (SCL line and SDA line) and the DDC/CEC Ground line are thus connected to the CPU 106 via the selector 203. The SCL line is connected to the CPU 106 so as to be unusable as the D+ line of the USB standard. The SDA line is connected to the CPU 106 so as to be unusable as the D− line of the USB standard. The DDC/CEC Ground line is connected to the CPU 106 so as to be unusable as the Ground line (GND) of the USB standard. The USB device controller 202 becomes unable to perform data transfer (including file transfer) complying with the USB standard. The DDC line (SCL line and SDA line) and the DDC/CEC Ground line are used as lines complying with the HDMI standard.

As described above, according to the second embodiment, pseudo USB cable insertion/removal is implemented, and power supply via the Reserved pin is possible. This enables use of USB bus power.

In the second embodiment, the combined HDMI cable 208 is usable even if at least one of the digital camera 201 and the TV 207 does not have the USB function. Hence, even when at least one of the digital camera 201 and the TV 207 does not have the USB function, the digital camera 201 and the TV 207 can perform communication complying with the HDMI standard.

Note that the selector 205 negates the Reserved pin immediately after one of the TV 207 and the digital camera 201 is powered on or immediately after they are connected via the combined HDMI cable 208. This allows a device which does not support the combined HDMI cable 208 to perform communication complying with the HDMI standard.

According to the second embodiment, the digital camera 201 and the TV 207 can use the Reserved pin as the power line (VBUS) of the USB standard. This allows a USB device such as the digital camera 201 to use the USB bus power.

Note that in the second embodiment, an embodiment in which the digital camera 201 serves as a communication device (transmission source) is described. However, the communication device (transmission source) according to the second embodiment can be any device other than the digital camera 201. For example, the communication device (transmission source) according to the second embodiment may be a video output device such as an HDD recorder, a DVD recorder, a personal computer, a set-top box, a digital video camera, or a cellular phone.

Additionally, in the second embodiment, an embodiment in which the TV 207 serves as a communication device (transmission destination) is described. However, the communication device (transmission destination) according to the second embodiment can be any device other than the TV 207. For example, the communication device (transmission destination) according to the second embodiment may be a video input device such as a personal computer or a projector.

Third Embodiment

When one of a digital camera and a TV independently has a communication I/F of the HDMI standard and that of the USB standard, the combined HDMI cables described in the first and second embodiments are not usable.

In the third embodiment, a conversion adapter will be explained which converts or separates one of the combined HDMI cables according to the first and second embodiments into an HDMI cable and a USB cable.

Figure 13:
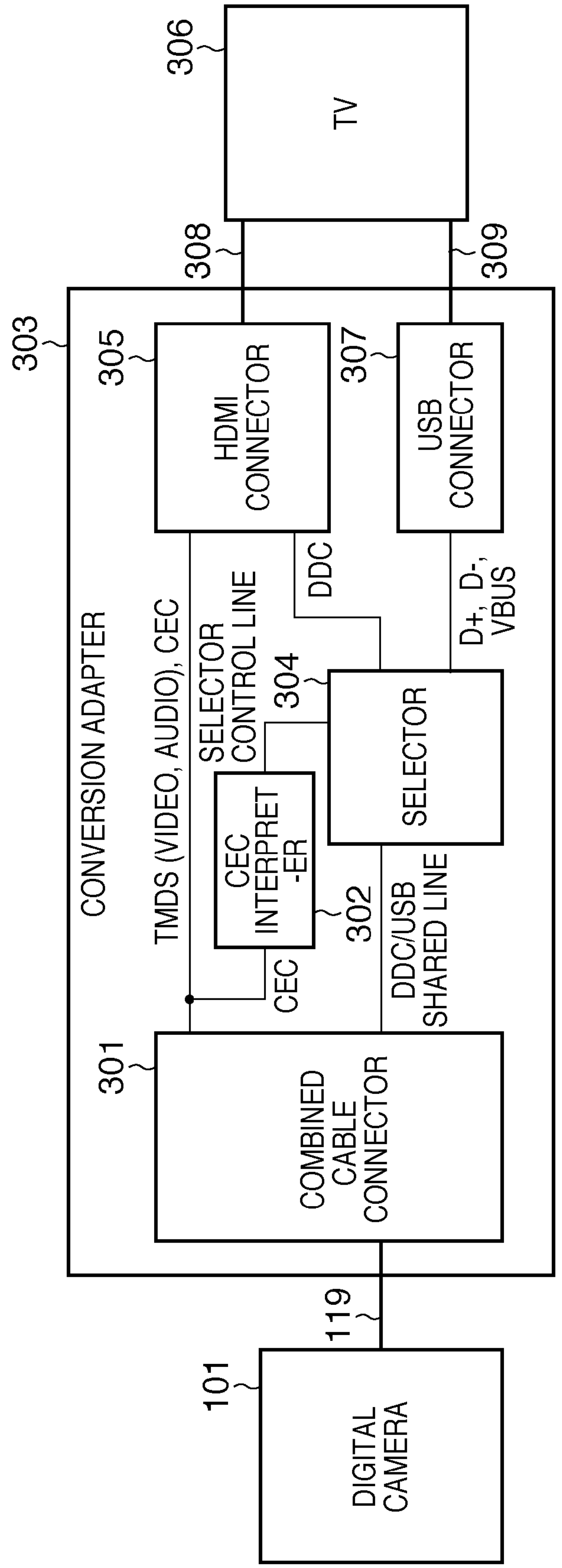
FIG. 13 is a block diagram showing an arrangement of a conversion adapter which converts or separates the combined HDMI cable according to the first embodiment into an HDMI cable and a USB cable.

FIG. 13 is a block diagram showing an arrangement of a conversion adapter 303 which converts or separates the combined HDMI cable 119 according to the first embodiment into an HDMI cable 308 and a USB cable 309. In FIG. 13, the same reference numerals as in FIG. 1 denote the same constituent elements, and a description thereof will not be repeated.

A television (TV) 306 has a communication function of the HDMI standard and that of the USB standard and includes independent connectors for the standards. That is, the TV 306 includes a connector and communication I/F complying with the HDMI standard and those complying with the USB standard.

The conversion adapter 303 includes a combined cable connector 301 (first connector), an HDMI connector 305 (second connector), and a USB connector 307 (third connector). The combined cable connector 301 connects a digital camera 101 as a first communication device. The HDMI connector 305 connects the TV 306 complying with the HDMI standard as a second communication device. The USB connector 307 connects the TV 306 complying with the USB standard as a third communication device. The combined cable connector 301 is connected to the digital camera 101 via the combined HDMI cable 119. The HDMI connector 305 is connected to the TV 306 via the HDMI cable 308. The USB connector 307 is connected to the TV 306 via the USB cable 309.

The conversion adapter 303 also includes a CEC interpreter 302 and a selector 304. The CEC interpreter 302 can interpret the USB on request command and the USB off request command which are extended CEC commands described in the first embodiment. The selector 304 can connect the DDC line (SCL and SDA) of the combined cable connector 301 to one of the DDC line (SCL and SDA) of the HDMI connector 305 and the data line (D+ and D−) of the USB connector 307.

The CEC interpreter 302 switches the connection destination of the selector 304 in accordance with an instruction (CEC command) received from the digital camera 101 via the CEC line. More specifically, when the CEC interpreter 302 receives the USB on request command, the selector 304 switches to communication based on the USB standard via the DDC line (SCL and SDA). In this case, the selector 304 connects the DDC line (SCL and SDA) of the combined cable connector 301 to the data line (D+ and D−) of the USB connector 307. When the CEC interpreter 302 receives a "USB use stop command", the selector 304 switches to communication based on the HDMI standard via the DDC line. In this case, the selector 304 connects the DDC line (SCL and SDA) of the combined cable connector 301 to the DDC line (SCL and SDA) of the HDMI connector 305.

Figure 14:
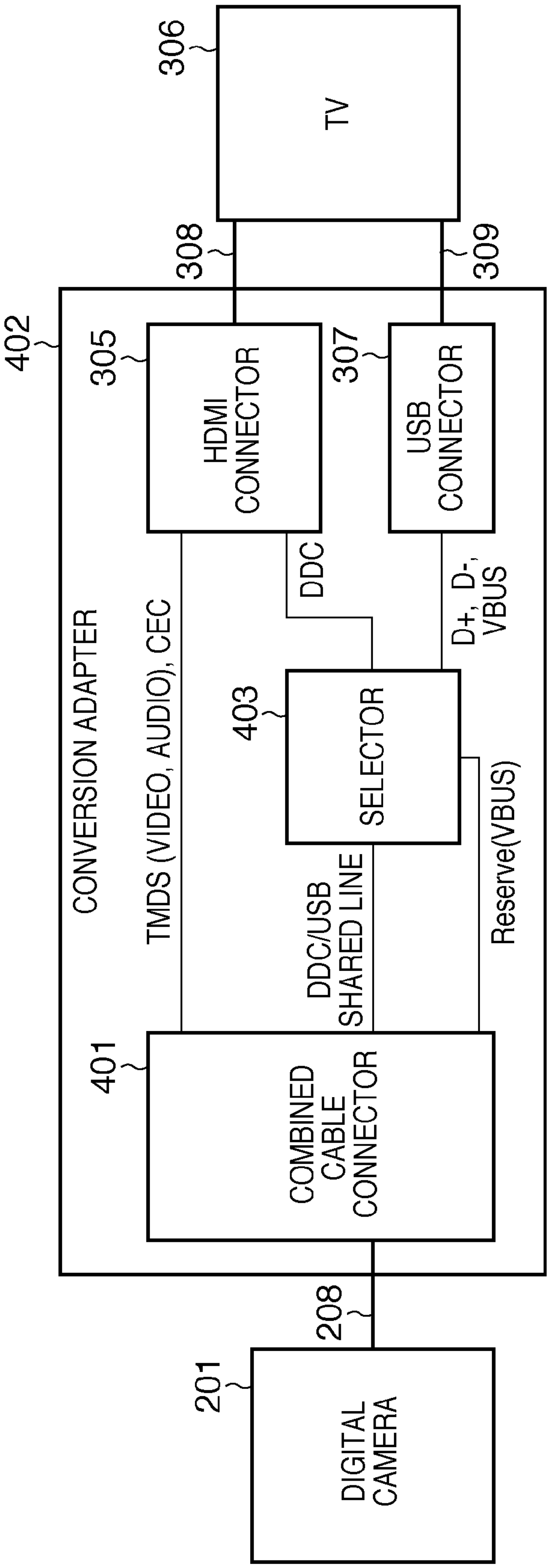
FIG. 14 is a block diagram showing an arrangement of a conversion adapter which converts or separates the combined HDMI cable according to the second embodiment into an HDMI cable and a USB cable.

FIG. 14 is a block diagram showing an arrangement of a conversion adapter 402 which converts or separates the combined HDMI cable 208 according to the second embodiment into the HDMI cable 308 and the USB cable 309. In FIG. 14, the same reference numerals as in at least one of FIGS. 7 and 13 denote the same constituent elements, and a description thereof will not be repeated.

The conversion adapter 402 includes a combined cable connector 401 which connects a digital camera 201 as a first communication device. The combined cable connector 401 is connected to the digital camera 201 via the combined HDMI cable 208. The conversion adapter 402 also includes a selector 403. The selector 403 can connect the DDC line (SCL and SDA) of the combined cable connector 401 to one of the DDC line (SCL and SDA) of the HDMI connector 305 and the data line (D+ and D−) of the USB connector 307.

The selector 403 switches connection based on the state of a line for the Reserved pin of the combined HDMI cable 208. More specifically, when the Reserved pin is asserted, the selector 403 switches to communication based on the USB standard via the DDC line (SCL and SDA). In this case, the selector 403 connects the DDC line (SCL and SDA) of the combined cable connector 401 to the data line (D+ and D−) of the USB connector 307. When the Reserved pin is negated, the selector 403 switches to communication based on the HDMI standard via the DDC line. In this case, the selector 403 connects the DDC line (SCL and SDA) of the combined cable connector 401 to the DDC line (SCL and SDA) of the HDMI connector 305.

As described above, according to the third embodiment, the conversion adapter 303 can convert or separate the combined HDMI cable 119 according to the first embodiment into the HDMI cable 308 and the USB cable 309. In addition, according to the third embodiment, the conversion adapter 402 can convert or separate the combined HDMI cable 208 according to the second embodiment into the HDMI cable 308 and the USB cable 309.

This makes it possible to connect the communication device according to the first embodiment to a communication device having a communication I/F complying with the HDMI standard or USB standard via the combined HDMI cable 119 and the conversion adapter 303. This also makes it possible to connect the communication device according to the second embodiment to a communication device having a communication I/F complying with the HDMI standard or USB standard via the combined HDMI cable 208 and the conversion adapter 402.

Note that in the third embodiment, the HDMI connector 305 and the USB connector 307 can connect different devices. In this case, the second communication device and the third communication device are different devices.

In the third embodiment, the device to be connected to the combined cable connector 301 can be any device other than the digital camera. For example, the device to be connected to the combined cable connector 301 may be a video output device such as an HDD recorder, a DVD recorder, a personal computer, a set-top box, a digital video camera, or a cellular phone.

In the third embodiment, the device to be connected to the combined cable connector 401 can be any device other than the digital camera. For example, the device to be connected to the combined cable connector 401 may be a video output device such as an HDD recorder, a DVD recorder, a personal computer, a set-top box, a digital video camera, or a cellular phone.

In the third embodiment, the device to be connected to the HDMI connector 305 can be any device other than the TV. For example, the device to be connected to the HDMI connector 305 may be a video input device such as a personal computer or a projector.

In the third embodiment, the device to be connected to the USB connector 307 can also be any device other than the TV. For example, the device to be connected to the USB connector 307 may be a video input device such as a personal computer or a projector.

Fourth Embodiment

The fourth embodiment will propose a communication device which implement EDID information transfer without disconnecting connection based on the USB standard.

Figure 15:
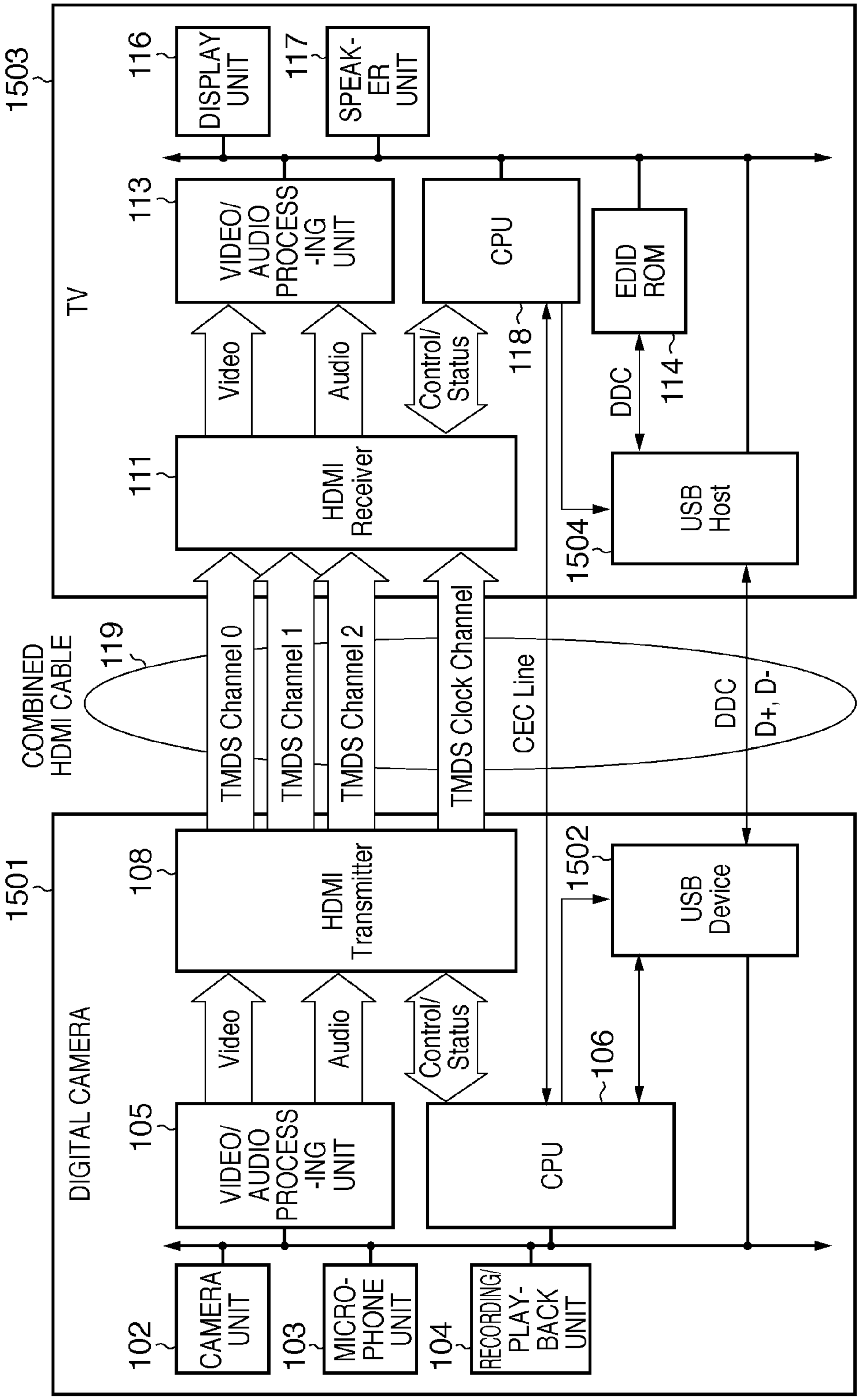
FIG. 15 is a block diagram showing arrangements of a digital camera and a television (TV) each of which serves as a communication device according to the fourth embodiment.

FIG. 15 is a block diagram showing arrangements of a digital camera 1501 and a television (TV) 1503 each of which serves as a communication device according to the fourth embodiment. In FIG. 15, the same reference numerals as in FIG. 1 denote the same constituent elements, and a description thereof will not be repeated.

As shown in FIG. 15, the digital camera 1501 and the TV 1503 are connected via the combined HDMI cable 119. The pin arrangement of the combined HDMI cable 119 is the same as in the first embodiment (FIGS. 2 to 4). One end of the DDC line (SCL and SDA) of the combined HDMI cable 119 is connected to a USB device controller 1502 of the digital camera 1501. The other end of the DDC control line (SCL and SDA) of the combined HDMI cable 119 is connected to a USB host controller 1504 of the TV 1503.

The digital camera 1501 serving as an HDMI source needs to read out information of the resolution and the like from an EDID ROM 114 of the TV 1503 serving as an HDMI sink using the DDC line (SCL and SDA). In the fourth embodiment, this readout is done in accordance with a communication protocol complying with the USB standard. This makes it possible to process an EDID information transfer request without disconnecting the connection based on the USB standard.

FIG. 16 is a flowchart illustrating a process of initializing USB connection and HDMI connection. Since the readout operation of the EDID ROM 114 is necessary for initializing HDMI connection, USB connection is initialized first in this initialization process. The process of this flowchart start when the USB device controller 1502 and the USB host controller 1504 detect electrical connection of the DDC line (SCL and SDA).

In step S1601, the USB device controller 1502 and the USB host controller 1504 initialize the USB. If the initialization has failed, the flowchart advances from step S1602 to step S1604. In step S1604, CPUs 106 and 118 invalidate USB connection and HDMI connection. In step S1604, for example, a display unit 116 displays an error message to notify the user that HDMI and USB connection errors have occurred. If the initialization has succeeded, the flowchart advances from step S1602 to step S1603.

In step S1603, the CPUs 106 and 118 initialize the HDMI. At this time, read access to the EDID ROM 114 is done in accordance with the following procedure. First, the CPU 106 transmits a readout request of the EDID ROM 114 to the CPU 118 using a CEC command. Upon receiving the readout request, the CPU 118 instructs the USB host controller 1504 to read-access the EDID ROM 114. The USB host controller 1504 transmits information read out from the EDID ROM 114 to the USB device controller 1502 in accordance with the USB standard. The USB device controller 1502 transmits the information received from the USB host controller 1504 to the CPU 106 via the DDC line. The CPU 106 can thus acquire the information stored in the EDID ROM 114.

If the initialization of the HDMI has failed, the flowchart advances from step S1605 to step S1607. In step S1607, the CPUs 106 and 118 validate USB connection and invalidate HDMI connection. In step S1607, for example, the display unit 116 displays an error message to notify the user that an HDMI connection error has occurred. In this case, the digital camera 1501 and the TV 1503 can execute only data transfer complying with the USB standard.

If the initialization of the HDMI has succeeded, the flowchart advances from step S1605 to step S1606. In step S1606, the CPUs 106 and 118 validate HDMI connection and USB connection. This allows the digital camera 1501 and the TV

1503 to execute both data transfer complying with the USB standard and DDC communication.

Figure 17:
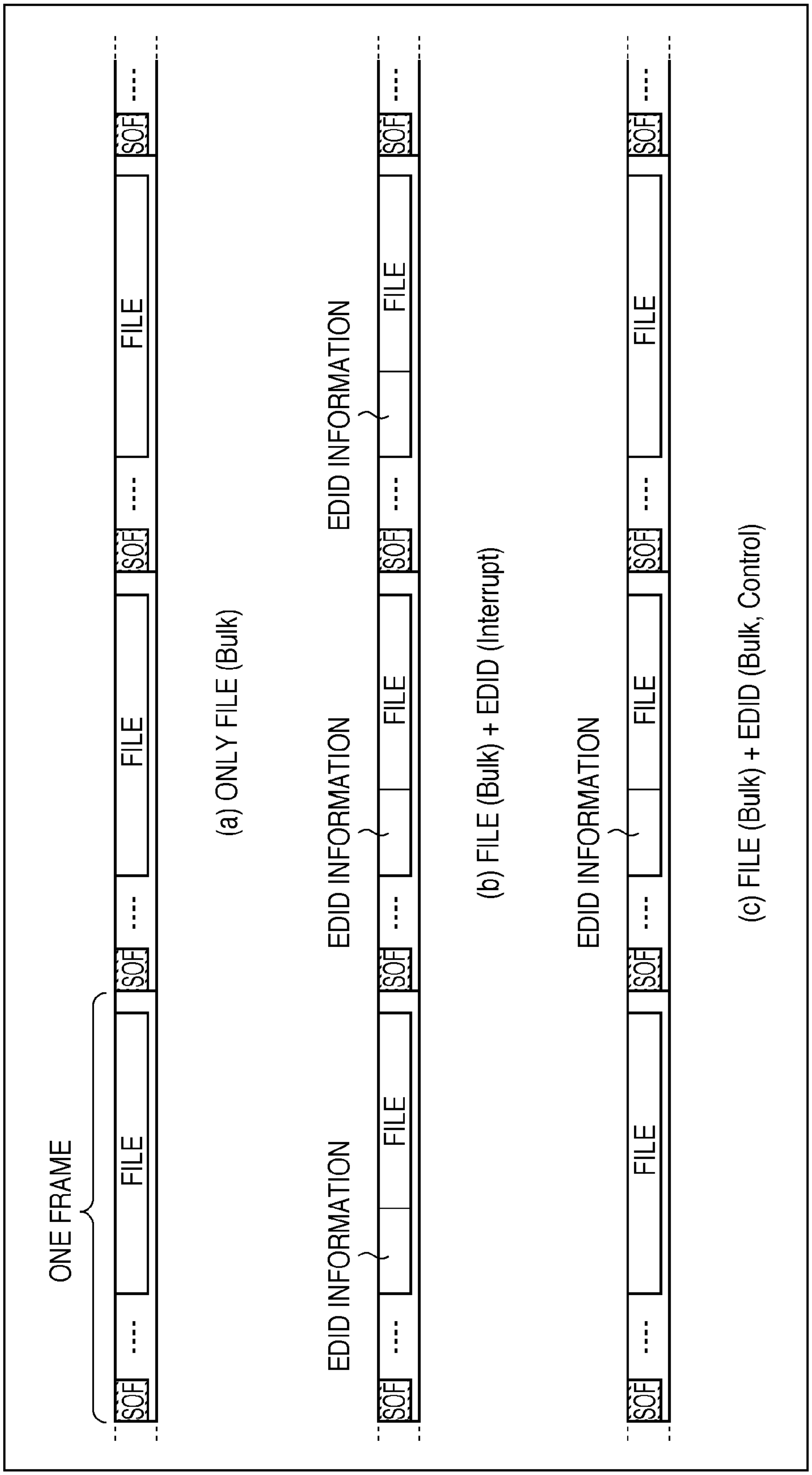
FIG. 17 is a view showing frames of the USB standard which are transferred between the digital camera and the TV.

FIG. 17 is a view showing frames of the USB standard which are transferred between the digital camera 1501 and the TV 1503. As indicated by (a) in FIG. 17, in the USB protocol, packet communication of a unit called a frame (or microframe) is performed. A frame can include a plurality of types of transactions. This enables an operation of transferring EDID information during a transmission of a file.

FIG. 17 also illustrates an example of a data structure on the USB line (SCL and SDA) when EDID information is transmitted by interrupt transfer during file transfer, as indicated by (b). Interrupt transfer of the USB enables periodical data transfer at an arbitrary timing. More specifically, the polling interval of the end point descriptor of the digital camera 1501 is set to a timing (e.g., 1 msec) necessary for the EDID readout. Additionally, the priority is set to be higher than that of file transfer (Bulk). This allows the TV 1503 to periodically transfer EDID information to the digital camera 1501 at that timing. Note that this is also possible in isochronous transfer.

Figure 18:
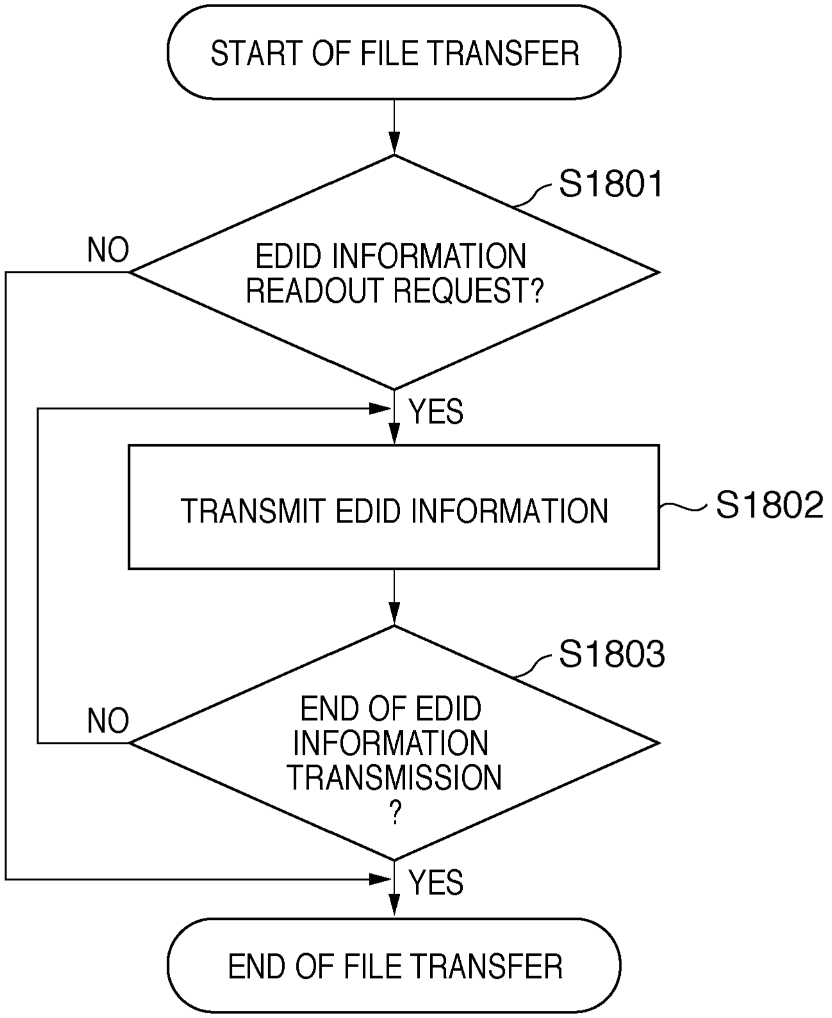
FIG. 18 is a flowchart illustrating a process of transferring EDID information during file transfer complying with the USB standard according to the fourth embodiment.

FIG. 17 also shows still another example of a data structure on the USB line when EDID information is transmitted by Control transfer or Bulk transfer during file transfer, as indicated by (c). FIG. 18 illustrates a process of the TV 1503 at this time.

In step S1801, the CPU 118 of the TV 1503 determines whether an EDID information readout request is received (the readout request is received via a CEC command). If the readout request is received, the flowchart advances from step S1801 to step S1802.

In step S1802, the CPU 118 instructs the USB host controller 1504 to interrupt file transfer and start EDID information transmission. Upon receiving this instruction, the USB host controller 1504 starts transmitting EDID information.

In step S1803, the CPU 118 determines whether EDID information transmission has finished. If the EDID information transmission has finished, the process of the flowchart ends. Note that if no readout request is received in step S1801, the process of the flowchart ends without interrupting file transfer.

As described above, according to the fourth embodiment, the USB host controller 1504 and the USB device controller 1502 can time-divisionally multiplex a signal complying with the HDMI standard and that complying with the USB standard (FIG. 17). In addition, the USB host controller 1504 and the USB device controller 1502 can demultiplex a signal complying with the USB standard and that complying with the HDMI standard. This makes it possible to process the EDID information transfer request without disconnecting connection based on the USB standard.

Note that in the fourth embodiment, the digital camera 1501 may have the USB host controller 1504, and the TV 1503 may have the USB device controller 1502.

In addition, in the fourth embodiment, an embodiment in which the digital camera 1501 serves as a communication device (transmission source) is described. However, the communication device (transmission source) according to the fourth embodiment can be any device other than the digital camera 1501. For example, the communication device (transmission source) according to the fourth embodiment may be a video output device such as an HDD recorder, a DVD recorder, a personal computer, a set-top box, a digital video camera, or a cellular phone.

Additionally, in the fourth embodiment, an embodiment in which the TV 1503 serves as a communication device (transmission destination) is described. However, the communication device (transmission destination) according to the fourth embodiment can be any device other than the TV 1503. For example, the communication device (transmission destination) according to the fourth embodiment may be a video input device such as a personal computer or a projector.

Other Embodiments

To implement the functions of the above-described embodiments, a recording medium which records software program codes to embody the functions may be supplied to a system or apparatus. The computer (CPU or MPU) of the system or apparatus reads out and executes the program codes stored in the recording medium, thereby implementing the functions of the above-described embodiments. In this case, the program codes read out from the recording medium themselves implement the functions of the above-described embodiments. The recording medium that records the program codes is also incorporated in the present invention. As the recording medium to supply the program codes, for example, a Floppy® disk, hard disk, optical disk, magnetooptical disk, or the like is usable. Also usable is a CD-ROM, CD-R, magnetic tape, nonvolatile memory card, ROM, or the like.

The arrangement for implementing the functions of the above-described embodiments is not limited to causing the computer to execute the readout program codes. The present invention also incorporates a case in which the OS (Operating System) running on the computer or the like partially or wholly executes actual process based on the instructions of the program codes, and the functions of the above-described embodiments are implemented by the process.

The program codes read out from the recording medium may be written in the memory of a function expansion board inserted to the computer or a function expansion unit connected to the computer. The present invention also incorporates a case in which the CPU of the function expansion board or function expansion unit then partially or wholly executes actual process based on the instructions of the program codes, and the functions of the above-described embodiments are implemented by the process.

The present invention is not limited to the above-described embodiment and various changes and modifications can be made within the spirit and scope of the present invention. Therefore, to apprise the public of the scope of the present invention, the following claims are made.

This application claims the benefit of Japanese Patent Application No. 2008-146216, filed Jun. 3, 2008, and Japanese Patent Application No. 2009-132112, filed Jun. 1, 2009, which are hereby incorporated by reference herein in their entirety.

The invention claimed is:

1. A communication device comprising:

a first communication unit that complies with an HDMI (High-Definition Multimedia Interface) standard;

a second communication unit that complies with a USB (Universal Serial Bus) standard; and a controller that selects, in accordance with a command received via a CEC (Consumer Electronics Control) line, one of the first communication unit and the second communication unit as a communication unit that uses a DDC (Display Data Channel) line, wherein the first communication unit is configured to connect to the DDC line, and the second communication unit is configured to connect to the DDC line.

2. The communication device according to claim 1, wherein the controller does not select the second communication unit when the first communication unit is using the DDC line.

3. The communication device according to claim 1, wherein the controller selects one of the first communication unit and the second communication unit when the first communication unit is not using the DDC line.

4. The communication device according to claim 1, wherein the DDC line is used as a data line of the USB standard if the second communication unit is selected in accordance with the command received via the CEC line.

5. The communication device according to claim 1, wherein the DDC line is used to transfer an image file or a sound file from the communication device to an external device if the second communication unit is selected in accordance with the command received via the CEC line.

6. The communication device according to claim 1, wherein the second communication unit is selected as a communication unit that uses the DDC line if the command received via the CEC line is a first command, and the first communication unit is selected as a communication unit that uses the DDC line if the command received via the CEC line is a second command different from the first command.

7. The communication device according to claim 1, wherein the communication device is configured to act as one of a camera and a video camera.

8. The communication device according to claim 1, wherein the communication device is configured to act as one of an HDD recorder, a DVD recorder, a personal computer, a set-top box, and a cellular phone.

9. The communication device according to claim 5, wherein the external device is capable of operating as an HDMI sink and is capable of operating as a USB host.

10. A method comprising:

receiving a command via a CEC (Consumer Electronics Control) line; and selecting, in accordance with the command received via the CEC line, one of a first communication unit and a second communication unit as a communication unit that uses a DDC (Display Data Channel) line, wherein the first communication unit complies with an HDMI (High-Definition Multimedia Interface) standard and is configured to connect to the DDC line, and the second communication unit complies with a USB (Universal Serial Bus) standard and is configured to connect to the DDC line.

11. The method according to claim 10, wherein the second communication unit is not selected when the first communication unit is using the DDC line.

12. The method according to claim 10, wherein one of the first communication unit and the second communication unit is selected when the first communication unit is not using the DDC line.

13. The method according to claim 10, wherein the DDC line is used as a data line of the USB standard if the second communication unit is selected in accordance with the command received via the CEC line.

14. The method according to claim 10, wherein the DDC line is used to transfer an image file or a sound file from a communication device to an external device if the second communication unit is selected in accordance with the command received via the CEC line.

15. The method according to claim 10, wherein the second communication unit is selected as a communication unit that uses the DDC line if the command received via the CEC line is a first command, and the first communication unit is selected as a communication unit that uses the DDC line if the command received via the CEC line is a second command different from the first command.

16. The method according to claim 10, wherein the method is applied to a communication device which is configured to act as one of a camera and a video camera.

17. The method according to claim 10, wherein the method is applied to a communication device which is configured to act as one of an HDD recorder, a DVD recorder, a personal computer, a set-top box, and a cellular phone.

18. The method according to claim 14, wherein the external device is capable of operating as an HDMI sink and is capable of operating as a USB host.

* * * * *